(12) United States Patent
Echigo

(10) Patent No.: US 11,319,885 B2
(45) Date of Patent: May 3, 2022

(54) CONTROL METHOD AND CONTROL DEVICE FOR VEHICULAR INTERNAL COMBUSTION ENGINE

(71) Applicant: NISSAN MOTOR CO., LTD., Yokohama (JP)

(72) Inventor: Ryo Echigo, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 44 days.

(21) Appl. No.: 16/767,688

(22) PCT Filed: Nov. 29, 2017

(86) PCT No.: PCT/JP2017/042752
§ 371 (c)(1),
(2) Date: May 28, 2020

(87) PCT Pub. No.: WO2019/106741
PCT Pub. Date: Jun. 6, 2019

(65) Prior Publication Data
US 2020/0386173 A1 Dec. 10, 2020

(51) Int. Cl.
*F02D 41/00* (2006.01)
*B60R 16/033* (2006.01)
(Continued)

(52) U.S. Cl.
CPC ........ *F02D 41/0007* (2013.01); *B60R 16/033* (2013.01); *F02D 41/2406* (2013.01); *F02M 35/10242* (2013.01); *F02D 2200/50* (2013.01)

(58) Field of Classification Search
CPC ............. F02D 41/0007; F02D 41/2406; F02D 2200/50; F02D 41/2422; F02D 2200/503;
(Continued)

(56) References Cited

U.S. PATENT DOCUMENTS 6,450,283 B1 * 9/2002 Taggett .................... B60K 3/00
180/304
2008/0276904 A1 * 11/2008 Surnilla .............. F02D 41/0082
123/406.45
(Continued)

FOREIGN PATENT DOCUMENTS

DE       102014019556 A1    6/2016
FR            3041696 A1    3/2017
(Continued)

*Primary Examiner* — Joseph J Dallo
(74) *Attorney, Agent, or Firm* — Faegre Drinker Biddle & Reath LLP

(57) ABSTRACT

A vehicular internal combustion engine system includes an internal combustion engine and an electric intake air supply device. The internal combustion engine is shifted into a stoichiometric combustion mode, and a lean combustion mode. The electric intake air supply device is driven by an on-vehicle battery, and employed to contribute a part of intake air quantity at least under a specific operating condition when in the lean combustion mode. A control method includes: determining a requested electric energy of the electric intake air supply device for a shift into the lean combustion mode in response to a shift from a stoichiometric combustion operation region into a lean combustion operation region; and continuing the stoichiometric combustion mode, without operation of the electric intake air supply device, when the on-vehicle battery is in an insufficient state of charge with respect to the requested electric energy.

10 Claims, 4 Drawing Sheets

(51) Int. Cl.
*F02D 41/24* (2006.01)
*F02M 35/10* (2006.01)

(58) Field of Classification Search
CPC ............ F02D 41/3076; F02D 41/1475; B60R 16/033; F02M 35/10242; F02M 26/06; F02B 37/04; F02B 37/162; F02B 39/10; Y02T 10/12

See application file for complete search history.

(56) References Cited

U.S. PATENT DOCUMENTS

| | | | |
|---|---|---|---|
| 2010/0300414 A1* | 12/2010 | Pursifull | F04B 49/02 123/559.1 |
| 2013/0255647 A1 | 10/2013 | Akashi et al. | |
| 2016/0363043 A1* | 12/2016 | Hirayama | F02B 33/40 |
| 2017/0074204 A1* | 3/2017 | Takamiya | F02D 13/0242 |
| 2017/0152801 A1 | 6/2017 | Löfgren | |
| 2017/0335779 A1* | 11/2017 | Hotta | F01L 1/047 |

FOREIGN PATENT DOCUMENTS

| | | |
|---|---|---|
| JP | 2007-2780 A | 1/2007 |
| JP | 2009-228586 A | 10/2009 |
| JP | 2016-138475 A | 8/2016 |
| JP | 2017-57770 A | 3/2017 |

\* cited by examiner

CONTROL METHOD AND CONTROL DEVICE FOR VEHICULAR INTERNAL COMBUSTION ENGINE

BACKGROUND

The present invention relates to a control method and a control device for a vehicular internal combustion engine structured to be shifted into a stoichiometric combustion mode in which a target air fuel ratio is set at or close to a stoichiometric air fuel ratio, and a lean combustion mode in which the target air fuel ratio is set lean, and particularly to a control method and a control device for a vehicular internal combustion engine where an electric intake air supply device is required to operate under a specific operating condition when in the lean combustion mode.

An internal combustion engine is known which is structured to be shifted into a stoichiometric combustion mode in which a target air fuel ratio is set to a stoichiometric air fuel ratio, and a lean combustion mode in which the target air fuel ratio is set lean. For this internal combustion engine, it is desirable to employ the lean combustion mode under a wider engine operating condition (engine torque and speed), in order to reduce fuel consumption.

A patent document 1 discloses supercharging of an internal combustion engine by an electric compressor driven by an on-vehicle battery. Patent document 1 describes that if a motor of the electric compressor is in a region of temperature where operation of the motor is limited, the internal combustion engine is substantially in a non-boost state (i.e. normal aspiration) even when in a region of boost.

In general, an NOx emission quantity emitted by an internal combustion engine (so-called engine-out NOx emission quantity) is reduced when an air fuel ratio is sufficiently lean, and is increased when a degree of being lean is insufficient. Under such a condition of lean combustion, a typical three-way catalyst does not function well. Accordingly, it is desirable to prevent an intermediate air fuel ratio between a sufficiently lean air fuel ratio and a stoichiometric air fuel ratio from being employed, in order to suppress the engine-out NOx emission quantity while reducing fuel consumption.

In order to achieve a sufficiently high air fuel ratio, it is required to supply a large quantity of air into a cylinder. If it is impossible to ensure a large quantity of air under an atmospheric pressure, it may require a supercharging means or intake air supply device.

If an electric intake air supply device such as an electric compressor is employed as an intake air supply device for lean combustion, it is possible that when a battery is in an insufficient state of charge, a motor rotation speed falls, and air supply becomes short with respect to a target lean air fuel ratio, so that an actual air fuel ratio becomes lower than the target lean air fuel ratio. This causes an increase in the engine-out NOx emission quantity.

In view of the foregoing, it is desirable to prevent employment of a less preferable intermediately lean air fuel ratio between a lean air fuel ratio and a stoichiometric air fuel ratio, wherein the NOx emission quantity is small at the lean air fuel ratio and at the stoichiometric air fuel ratio, and thereby prevent the engine-out NOx emission quantity from being increased.

Patent Document(s)

Patent Document 1: Japanese Patent Application Publication No. 2009-228586

SUMMARY

According to the present disclosure, a control method and a control device for an internal combustion engine system are provided with an internal combustion engine and an electric intake air supply device, wherein the internal combustion engine is structured to be shifted into a stoichiometric combustion mode in which a target air fuel ratio is set at or close to a stoichiometric air fuel ratio, and a lean combustion mode in which the target air fuel ratio is set lean, and wherein the electric intake air supply device is structured to be driven by an on-vehicle battery, and employed to contribute a part of intake air quantity at least under a specific operating condition when in the lean combustion mode.

According to the present disclosure, it includes predefining a stoichiometric combustion operation region employing the stoichiometric combustion mode and a lean combustion operation region employing the lean combustion mode, with respect to a torque and a rotation speed of the internal combustion engine as parameters; determining a requested electric energy of the electric intake air supply device for a shift into the lean combustion mode in response to a shift from the stoichiometric combustion operation region into the lean combustion operation region; and continuing the stoichiometric combustion mode when the on-vehicle battery is in an insufficient state of charge with respect to the requested electric energy.

Accordingly, when the on-vehicle battery is in an insufficient state of charge, operation at or close to the stoichiometric air fuel ratio is continued without shifting into the lean combustion mode. This serves to prevent emission of NOx due to shifting into the lean combustion mode, and prevent a following increase of NOx due to degraded operation of the electric intake air supply device. At or close to the stoichiometric air fuel ratio, exhaust gas purification is possible by a three-way catalyst.

DETAILED DESCRIPTION

The following describes an embodiment of the present invention in detail with reference to the drawings.

Figure 1:
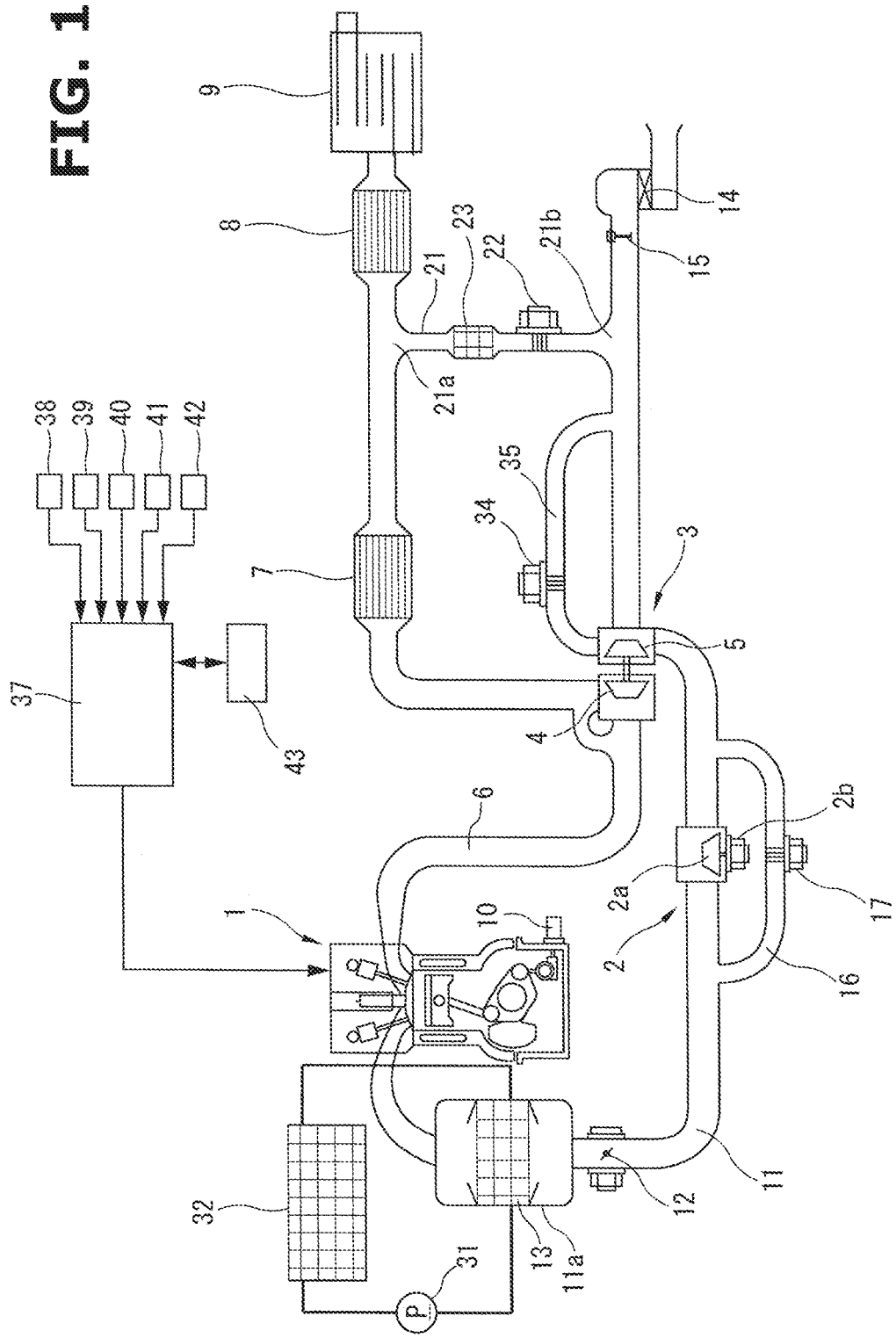
FIG. 1 is an illustrative view showing configuration of an internal combustion engine system according to an embodiment of the present invention.

FIG. 1 shows system configuration of an internal combustion engine 1 according to an embodiment of the present invention. The embodiment employs an electric supercharger 2 and a turbocharger 3 together as supercharging means. Internal combustion engine 1 is a four-stroke-cycle spark-ignition gasoline engine in this example, and is structured to be shifted into a stoichiometric combustion mode in which a target air fuel ratio is set at or close to a stoichiometric air fuel ratio (i.e. excess air ratio λ=1), and a lean combustion mode in which the target air fuel ratio is set lean (i.e. λ=2 or its proximity).

Internal combustion engine 1 includes an exhaust passage 6 in which an exhaust turbine 4 of turbocharger 3 is disposed and an upstream exhaust catalytic converter 7 and a downstream exhaust catalytic converter 8 are disposed downstream of exhaust turbine 4, wherein each exhaust catalytic converter is composed of a three-way catalyst. Each of upstream exhaust catalytic converter 7 and downstream exhaust catalytic converter 8 may be composed of a so-called NOx storage catalyst. In a further downstream section of exhaust passage 6, an exhaust silencer 9 is provided. Exhaust passage 6 is opened to the outside through exhaust silencer 9. Exhaust turbine 4 is provided with a publicly-known waste gate valve not shown for boost pressure control.

Internal combustion engine 1 is provided with a variable compression ratio mechanism employing a multilink mechanism as a piston-crank mechanism in this example, wherein the variable compression ratio mechanism includes an electric actuator 10 for varying a compression ratio. At least one of an intake valve set and an exhaust valve set may be provided with an electric variable valve timing mechanism and/or an electric variable valve lift mechanism.

Internal combustion engine 1 includes an intake passage 11 in which a compressor 5 of turbocharger 3 is disposed, and an electronically controlled throttle valve 12 is disposed downstream of compressor 5 for controlling a quantity of intake air. Throttle valve 12 is located at an inlet side of a collector section 11a. On the downstream side of collector section 11a, intake passage 11 is branched as an intake manifold to each cylinder. In collector section 11a, an intercooler 13 is provided for cooling supercharged air. Intercooler 13 is of a water-cooled type in which cooling water is circulated by action of a pump 31 in a system including a radiator 32.

For compressor 5, a recirculation passage 35 is arranged to allow communication between an outlet side of compressor 5 and an inlet side of compressor 5, and is provided with a recirculation valve 34. When internal combustion engine 1 is decelerating, i.e. when throttle valve 12 is rapidly closed, recirculation valve 34 is controlled into an opened state, thereby allowing pressurized intake air to be recirculated to compressor 5 via recirculation passage 35.

In an upstream end section of intake passage 11, an air cleaner 14 is disposed, and an air flow meter 15 is disposed downstream of air cleaner 14 for sensing the intake air quantity. Electric supercharger 2 is disposed between compressor 5 and collector section 11a. In this way, in intake passage 11, compressor 5 of turbocharger 3 and electric supercharger 2 are arranged in series, wherein electric supercharger 2 is located downstream of compressor 5.

Electric supercharger 2 includes an inlet side and an outlet side which are connected to each other via a bypass passage 16 outside of electric supercharger 2. Bypass passage 16 is provided with a bypass valve 17 for opening and closing the bypass passage 16. When electric supercharger 2 is at rest, bypass valve 17 is in an opened state.

Electric supercharger 2 includes: a compressor 2a provided in intake passage 11; and an electric motor 2b for driving the compressor 2a. In FIG. 1, compressor 2a is shown as a centrifugal compressor similar to compressor 5 of turbocharger 3, but may be implemented by a compressor of an arbitrary type such as a roots blower or a screw-type compressor. Electric motor 2b is driven by an on-vehicle battery not shown as a power supply. In the present embodiment, electric supercharger 2 serves as an electric intake air supply device.

Between exhaust passage 6 and intake passage 11, an exhaust gas recirculation passage 21 is provided for recirculating a part of exhaust gas into an intake air system. Exhaust gas recirculation passage 21 includes a first end 21a as an upstream end, which is branched from a section of exhaust passage 6 downstream of exhaust turbine 4, specifically, branched from a section between upstream exhaust catalytic converter 7 and downstream exhaust catalytic converter 8. Exhaust gas recirculation passage 21 includes a second end 21b as a downstream end, which is connected to a section of intake passage 11 upstream of compressor 5. In an intermediate section of exhaust gas recirculation passage 21, an exhaust gas recirculation valve 22 is disposed, and includes an opening that is controlled variably in accordance with an operating condition. Furthermore, in a section of exhaust gas recirculation passage 21 between exhaust gas recirculation valve 22 and exhaust passage 6, an EGR gas cooler 23 is disposed for cooling recirculated exhaust gas.

Internal combustion engine 1 is controlled in an integrated manner by an engine controller 37. Engine controller 37 receives input of sensing signals from various sensors, namely, air flow meter 15, a crank angle sensor 38 for sensing an engine speed, a water temperature sensor 39 for sensing a cooling water temperature, an accelerator opening sensor 40 for sensing an amount of depression of an accelerator pedal operated by an operator, and serving as a sensor for sensing a torque request by an operator, a boost pressure sensor 41 for sensing a boost pressure (intake air pressure) in collector section 11a, an air fuel ratio sensor 42 for sensing an exhaust air fuel ratio, etc. Engine controller 37 is connected to a battery controller 43 for sensing a state of charge or SOC of a battery not shown, and receives input of a signal indicative of the SOC from battery controller 43. Based on these sensing signals, engine controller 37 optimally controls a fuel injection quantity, a fuel injection timing, an ignition timing, the opening of throttle valve 12, action of electric supercharger 2, the opening of bypass valve 17, the opening of the wastegate valve not shown, the opening of recirculation valve 34, the opening of exhaust gas recirculation valve 22, etc. of internal combustion engine 1.

Figure 2:
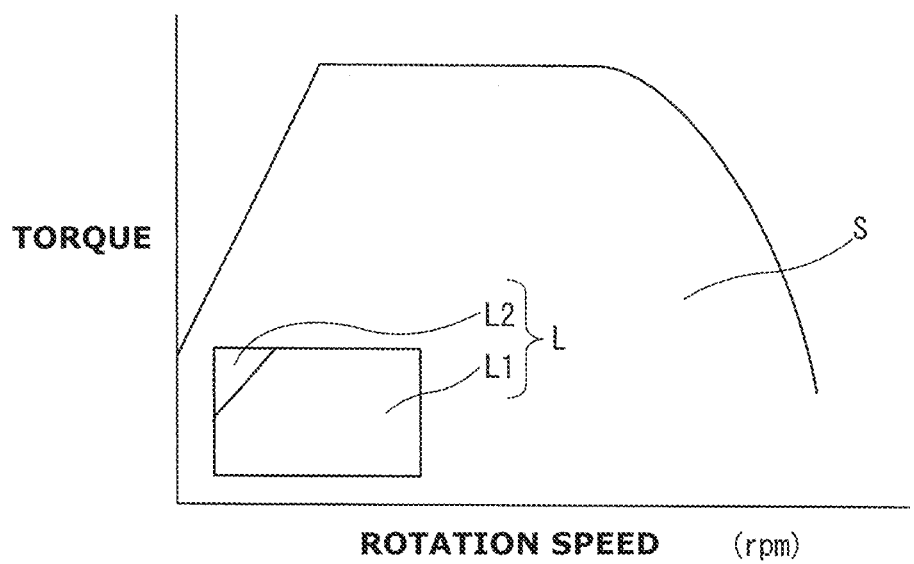
FIG. 2 is an illustrative view showing a control map defining a stoichiometric combustion operation region and a lean combustion operation region.

FIG. 2 shows a control map defining a stoichiometric combustion operation region S and a lean combustion operation region L with respect to the torque (or load) and rotation speed of internal combustion engine 1 as parameters, wherein the stoichiometric combustion mode should be employed when in the stoichiometric combustion operation region S, and the lean combustion mode should be employed when in the lean combustion operation region L. The control map is stored beforehand in a memory device of engine controller 37 together with target air fuel ratio maps described below. The lean combustion operation region L is set in a region where the engine torque is relatively small and the engine speed is middle or low. The region other than the lean combustion operation region L is basically occupied by the stoichiometric combustion operation region S. Although not shown specifically in FIG. 2, in a part of the stoichiometric combustion operation region S close to full throttle operation, the target air fuel ratio is slightly richer than the stoichiometric air fuel ratio. The lean combustion operation region L includes a first lean combustion operation region L1 in which air supply does not depend on electric supercharger 2, and a second lean combustion operation region L2 in which air supply depends on electric supercharger 2. The second lean combustion operation region L2 is a part of the lean combustion operation region L where the engine speed is low and the load is high. In the second lean combustion operation region L2, electric supercharger 2 is employed to contribute a part of the intake air quantity.

When the operating condition (torque and rotation speed) of internal combustion engine 1 is in the stoichiometric combustion operation region S, internal combustion engine 1 is operated in the stoichiometric combustion mode where a stoichiometric air fuel ratio map is employed as a target air fuel ratio map, and the fuel injection timing and ignition timing and others are set suitable for stoichiometric combustion. A target air fuel ratio map is a map where the target air fuel ratio is set for each operating point defined by the torque and rotation speed. In the stoichiometric air fuel ratio map employed by the stoichiometric combustion mode, the target air fuel ratio is set at or close to the stoichiometric air fuel ratio for each operating point in both of the stoichiometric combustion operation region S and the lean combustion operation region L. In the present disclosure, "at or close to the stoichiometric air fuel ratio" means a range of air fuel ratio that allows a three way catalyst to function, and in this example, means a range of 14.5-15.0 under assumption that the stoichiometric air fuel ratio is equal to 14.7. In the stoichiometric air fuel ratio map, the target air fuel ratio may be set to 14.7 for every operating point, or may be set to a different value of 14.6 or 14.8 at some operating points based on other conditions.

On the other hand, when the operating condition of internal combustion engine 1 is in the lean combustion operation region L, internal combustion engine 1 is operated in the lean combustion mode where a lean air fuel ratio map is employed as a target air fuel ratio map, and the fuel injection timing and ignition timing and others are set suitable for lean combustion. In the lean air fuel ratio map employed by the lean combustion mode, the target air fuel ratio is set lean for each operating point in the lean combustion operation region L. The target air fuel ratio being "lean" in the lean combustion mode is a lean air fuel ratio at which the engine-out NOx emission quantity is low to some extent, and in this embodiment, in a range of 25-33 close to a condition of $\lambda=2$. This range is only an example. In the present disclosure, the lean air fuel ratio in the lean combustion mode may be arbitrary as long as the lean air fuel ratio is in a lean range that is discontinuous with the air fuel ratio range close to the stoichiometric air fuel ratio for the stoichiometric air fuel ratio map (namely, as long as the two ranges are separated away from each other). In the lean air fuel ratio map, normally, the target air fuel ratio is not set constant for the operating points, but is set slightly different depending on the torque and rotation speed. The lean air fuel ratio map may be set to include data about the target air fuel ratios for the operating points in the stoichiometric combustion operation region S. In this setting, the target air fuel ratio is set at or close to the stoichiometric air fuel ratio for each operating point in the stoichiometric combustion operation region S.

In the lean combustion operation region L, the target air fuel ratio setting for the first lean combustion operation region L1 is not different significantly from that for the second lean combustion operation region L2. The target air fuel ratio is set lean around the condition of $\lambda=2$ as described above, for both of the first lean combustion operation region L1 and the second lean combustion operation region L2. However, the target air fuel ratio being lean can be achieved without employment of electric supercharger 2 in the first lean combustion operation region L1, but cannot be achieved in the second lean combustion operation region L2, if electric intake air supply device 2 cannot function as desired, because the target air fuel ratio for the second lean combustion operation region L2 is set under assumption that electric supercharger 2 is operating.

If operation shifts into the lean combustion operation region L, especially, into the second lean combustion operation region L2, when the SOC of the on-vehicle battery is low, it is possible that electric power supplied to electric supercharger 2 becomes short in a relatively short time period, thereby reducing intake air supply of electric supercharger 2, and cannot allow achievement of the target air fuel ratio being lean. In such a situation, if the actual air fuel ratio falls depending on the intake air quantity that can be supplied, the engine-out NOx emission quantity increases as described above. Furthermore, during the shift from the stoichiometric combustion mode into the lean combustion mode, the NOx emission quantity increases temporarily because the intermediate air fuel ratio setting is employed transiently.

Moreover, if NOx trapped in exhaust catalytic converters 7, 8 is treated by a temporarily enhancement of air fuel ratio, namely, a so-called rich spike, the fuel consumption for rich spike operation increases due to the increase of the engine-out NOx emission quantity. The operation by the lean combustion mode where the target air fuel ratio is set lean, is advantageous in the fuel efficiency as compared to the operation by the stoichiometric combustion mode. However, if the time period of operation in the lean combustion mode, which causes an increase in the engine-out NOx emission quantity, is short, the fuel consumption is adversely affected by the rich spike request.

In view of the foregoing, the present embodiment is configured to continue the stoichiometric combustion mode without shifting into the lean combustion mode even with a request for operation in the lean combustion mode, when the battery SOC is less than or equal to a predetermined threshold (or lower limit). Namely, even with a shift into the lean combustion operation region L, the target air fuel ratio is set at or close to the stoichiometric air fuel ratio based on the stoichiometric air fuel ratio map. When the air fuel ratio is at or close to the stoichiometric air fuel ratio, the three-way catalysts can function for exhaust gas purification, so that the NOx emission quantity to the outside is reduced. Even if the NOx treatment is implemented by rich spike operation, the fuel consumption is suppressed from being adversely affected by rich spike operation.

Figure 3:
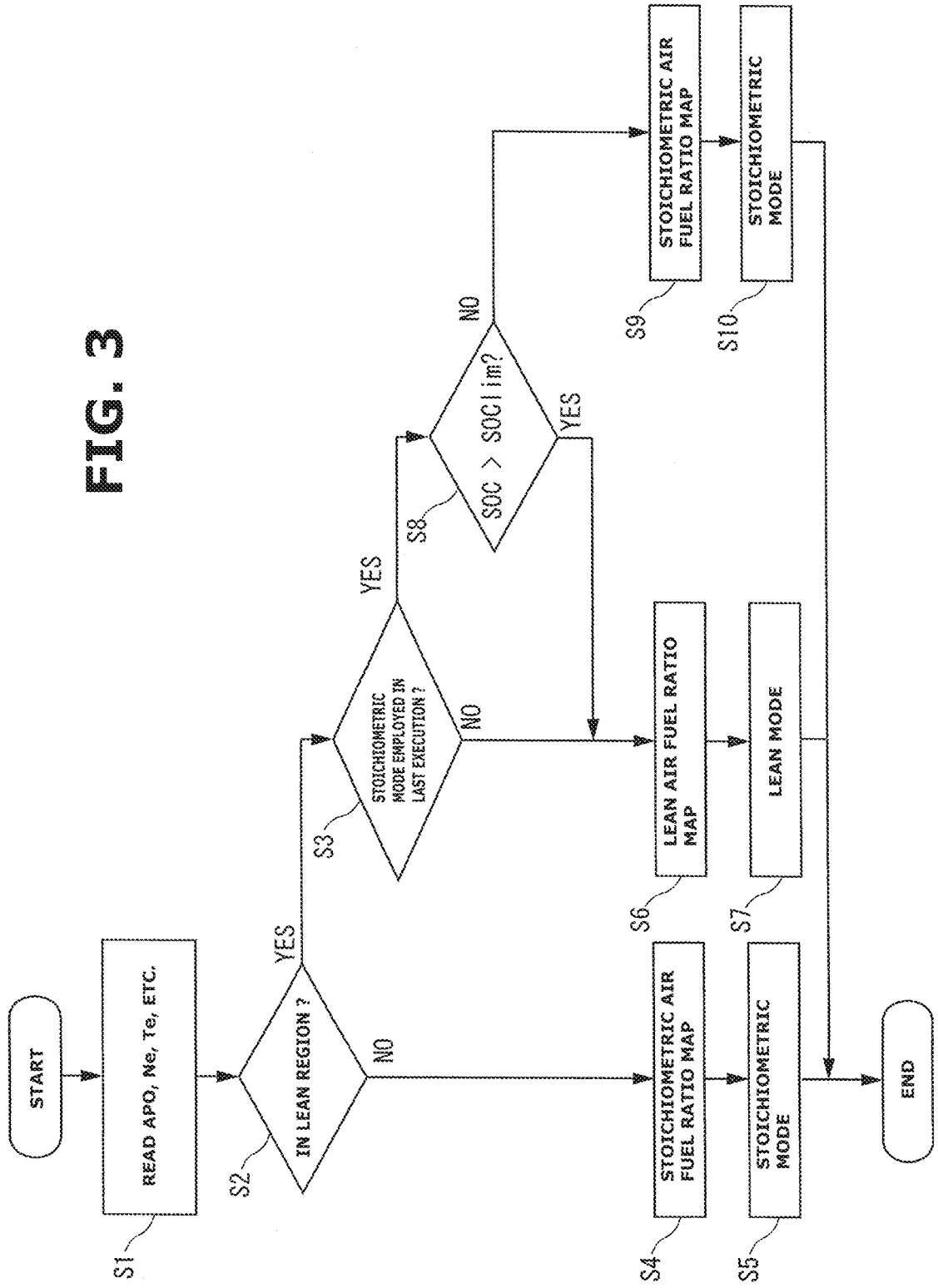
FIG. 3 is a flow chart showing a flow of combustion mode shift control.

FIG. 3 is a flow chart showing a flow of such combustion mode shift control. The flow chart shows a routine that is executed repeatedly by engine controller 37 at intervals of a predetermined calculation cycle. At Step 1, engine controller 37 reads various parameters from signals inputted from the sensors, and internal signals calculated in engine controller 37. Specifically, engine controller 37 reads accelerator opening APO (amount of depression of the accelerator pedal), rotation speed Ne and torque Te, boost pressure, etc. of internal combustion engine 1.

At Step 2, engine controller 37 determines whether or not the operating point of the current calculation cycle is in the lean combustion operation region L. When the operating point is in the stoichiometric combustion operation region S, engine controller 37 then proceeds from Step 2 to Step 4, and selects the stoichiometric air fuel ratio map as a target air fuel ratio map, and then proceeds to Step 5, and performs operation in the stoichiometric combustion mode. Namely, when the stoichiometric combustion mode has been employed, the stoichiometric combustion mode is then continued, and when the lean combustion mode has been employed, operation is shifted into the stoichiometric combustion mode.

When determining at Step 2 that the operating point is in the lean combustion operation region L, engine controller 37 then proceeds to Step 3, and determines whether or not the current combustion mode is the stoichiometric combustion mode, namely, whether or not the stoichiometric combustion mode has been employed. In case of NO, since the lean combustion mode is already employed, engine controller 37 then proceeds to Step 6, and selects the lean air fuel ratio map as a target air fuel ratio map, and proceeds to Step 7, and continues operation in the lean combustion mode.

When determining at Step 3 that the stoichiometric combustion mode has been employed, which means that a shift occurs from the stoichiometric combustion operation region S into the lean combustion operation region L, engine controller 37 therefore proceeds from Step 3 to Step 8, and determines whether or not the battery SOC is greater than a lower limit SOClim described below.

When determining at Step 8 that the battery SOC is greater than the lower limit SOClim, engine controller 37 then proceeds from Step 8 to Step 6, and selects the lean air fuel ratio map as a target air fuel ratio map, and then proceeds to Step 7, and performs operation in the lean combustion mode. Namely, a shift is caused from the stoichiometric combustion mode into the lean combustion mode. When a shift is caused from the stoichiometric combustion mode into the lean combustion mode, electric supercharger 2 is operated temporarily even in the first lean combustion operation region L1, for compensating for a delay of response of change of the intake air quantity.

On the other hand, when determining at Step 8 that the battery SOC is less than or equal to the lower limit SOClim, engine controller 37 then proceeds to Step 9, and selects the stoichiometric air fuel ratio map as a target air fuel ratio map, and then proceeds to Step 10, and performs operation in the stoichiometric combustion mode. Namely, even when the operating point shifts into the lean combustion operation region L, the shift into the lean combustion mode is inhibited, and the operation based on the stoichiometric combustion mode is continued.

In one example, the lower limit SOClim is set so as to satisfy an electric energy of electric supercharger 2 sufficient to maintain achievement of the target air fuel ratio of the lean combustion mode during a specific time period, when in the second lean combustion operation region L2 after shifting into the lean combustion mode. Specifically, the lower limit SOClim is set based on a sum of a first electric energy and a second electric energy (i.e. total electric energy request), wherein the first electric energy is an electric energy of electric supercharger 2 required to maintain achievement of the target air fuel ratio of the lean combustion mode during a specific time period, when in the second lean combustion operation region L2, and wherein the second electric energy is an electric energy required by other electric components including an electric component accompanying the internal combustion engine 1, such as electric actuator 10 for the variable compression ratio mechanism. The required electric energy of electric supercharger 2 correlates with a pressure difference between inlet-side pressure and outlet-side pressure of electric supercharger 2, and can be estimated from various parameters including torque Te and rotation speed Ne of internal combustion engine 1.

In another example, under assumption that NOx treatment is implemented by rich spike operation, the lower limit SOClim is set as follows. First, it finds out an operating point in the second lean combustion operation region L2 at which a difference in fuel consumption between the lean combustion mode where the target air fuel ratio is set lean and the stoichiometric combustion mode where the target air fuel ratio is set at or close to the stoichiometric air fuel ratio; and then calculates a difference in fuel consumption per unit time ($\Delta F$) for the found operating point. Next, it determines an NOx emission quantity caused transiently by a shift from the stoichiometric combustion mode into the lean combustion mode, and an NOx emission quantity caused transiently by a following shift from the lean combustion mode into the stoichiometric combustion mode; and then calculates a quantity of fuel (Fa) required to treat these NOx emission quantities by rich spike operation.

Then, it calculates a break-even point of duration T of operation in the lean combustion mode, at which a fuel quantity $\Delta F \cdot T$ obtained by multiplying the fuel consumption difference per unit time $\Delta F$ by duration T (i.e. a quantity of fuel reduced by setting the air fuel ratio lean) exceeds the fuel quantity required by rich spike operation, Fa. If the air fuel ratio can be maintained lean for a duration longer than duration T, execution of the shift into the lean combustion mode is advantageous in view of fuel consumption. On the other hand, if the lean combustion mode with employment of electric supercharger 2 cannot be maintained for a duration longer than duration T as a break-even point, it may adversely affect the fuel consumption, depending on where the operating point is. Accordingly, in such a situation, it is advantageous not to perform the combustion mode shift.

Finally, it determines electric power consumption for a situation where electric supercharger 2 is operated to output its maximum power during duration T, and sets the lower limit SOClim based on the determined electric power consumption. As described above, it is desirable to take account of electric power consumption of the other electric components during duration T.

In a further example, in consideration of a predicted pattern of vehicle operation during automatic vehicle running, it can set an electric energy requested for continuation of operation in the lean combustion mode based on the lean air fuel ratio for a specific time period, and thereby set the lower limit SOClim of the battery SOC successively. For example, it predicts changes of the operating point of internal combustion engine 1 during a future constant time period (10 seconds, for example), based on one or more of a host vehicle speed, an inter-vehicle distance between a host vehicle and a preceding vehicle, a set cruise speed, a road gradient, a road curvature, a traffic signal condition, etc.; and precisely calculates electric power consumption of electric supercharger 2 at each operating point in the second lean combustion operation region L2; and thereby determines a requested electric energy required by the combustion mode shift. The lower limit SOClim is set so as to satisfy the requested electric energy. As described above, it is desirable to take account of electric power consumption of the other electric components.

Figure 5:
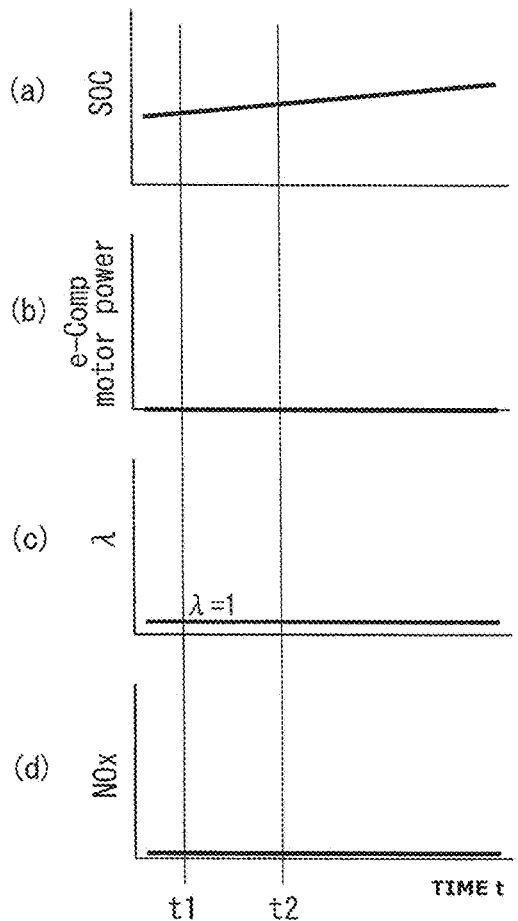
FIG. 5 is a time chart showing mode shifting according to the embodiment in comparison with a comparative example.
Figure 5:
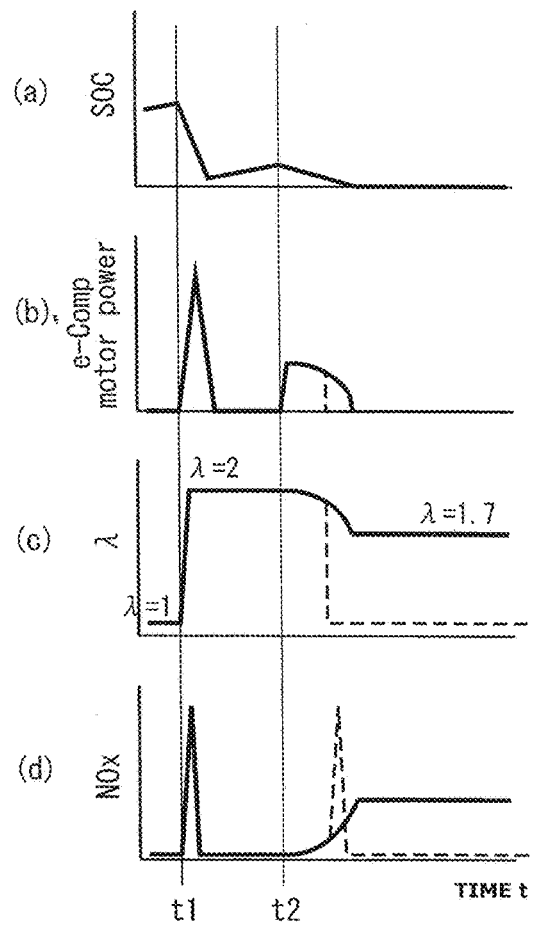

FIG. 5 is a time chart illustrating behavior under the control described above. In FIG. 5, the left side shows the embodiment, and the right side shows a comparative example. Each side shows behavior in a situation where at a time instant t1, a shift occurs from the stoichiometric combustion operation region S into the first lean combustion operation region L1, and at a time instant t2 immediately after time instant t1, a shift occurs from the first lean combustion operation region L1 into the second lean combustion operation region L2. In FIG. 5, (a) shows changes of the battery SOC, (b) shows changes of electric power supplied to electric supercharger 2, (c) shows changes of the excess air ratio of internal combustion engine 1, and (d) shows changes of the NOx emission quantity.

First, the following describes the comparative example. At a time instant t1 when a shift occurs from the stoichiometric combustion operation region S into the first lean combustion operation region L1, it performs a shift from the stoichiometric combustion mode into the lean combustion mode although the battery SOC is less than or equal to the lower limit SOClim. This shift causes electric supercharger 2 to be activated temporarily, and thereby causes a decrease in the SOC. The NOx emission quantity increases temporarily, because the air fuel ratio passes through the intermediate band of air fuel ratio during the air fuel ratio shifting.

Until a time instant t2, the air fuel ratio is maintained lean as targeted with electric supercharger 2 stopped, because it is in the first lean combustion operation region L1. At time instant t2, it shifts from the first lean combustion operation region L1 into the second lean combustion operation region L2, so that electric supercharger 2 is activated, but is stopped after a relatively short time period, because the battery SOC is low and power supply to electric supercharger 2 is insufficient, in the shown example. Accordingly, the excess air ratio becomes unable to be maintained at the target "$\lambda=2$", and after stopping of electric supercharger 2, remains at or close to "$\lambda=1.7$" in this example. This causes an increase in the NOx emission quantity as shown in (d).

In the shown comparative example, broken lines represent characteristics for a situation in which the shift into the stoichiometric combustion mode is forced at a stage where the rotation speed of electric supercharger 2 has fallen to some extent. In this case, the shift from the lean combustion mode into the stoichiometric combustion mode causes the NOx emission quantity to increase temporarily when the air fuel ratio passes through the intermediate band of air fuel ratio.

On the other hand, according to the embodiment shown in the left side of FIG. 5, at a time instant t1 when a shift occurs from the stoichiometric combustion operation region S into the first lean combustion operation region L1, operation in the stoichiometric combustion mode is continued without shifting into the lean combustion mode, because the battery SOC is less than or equal to the lower limit SOClim. This prevents the combustion mode shift from increasing the NOx.

Figure 4:
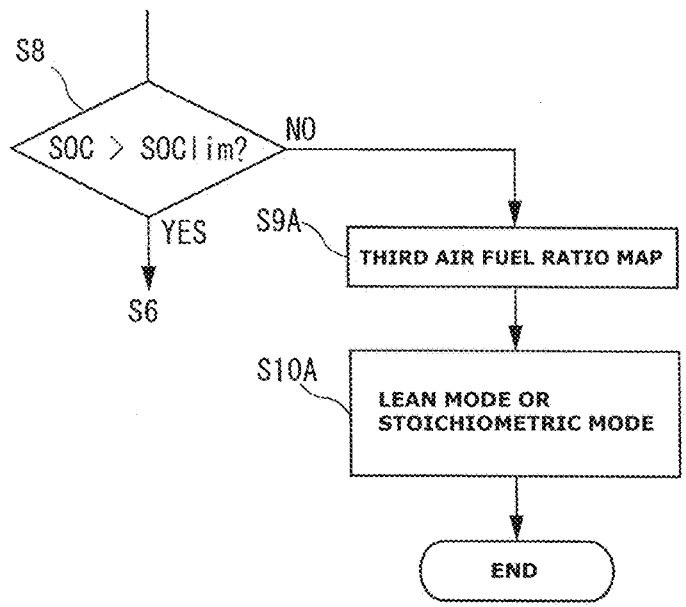
FIG. 4 is a flow chart showing a related part of an embodiment provided with a third air fuel ratio map.

Next, FIG. 4 shows a related part of a flow chart according to a second embodiment provided with a third air fuel ratio map that is employed when the battery SOC is low, in addition to the stoichiometric air fuel ratio map and lean air fuel ratio map employed normally. The part of the flow chart not shown is similar to the flow chart of FIG. 3. In the third air fuel ratio map, the target air fuel ratio is set at or close to the stoichiometric air fuel ratio or set lean, for each operating point in an operation region including both of the stoichiometric combustion operation region S and the lean combustion operation region L, under assumption that electric supercharger 2 is at rest. For example, in the stoichiometric combustion operation region S and the second lean combustion operation region L2, the target air fuel ratio is set at or close to the stoichiometric air fuel ratio. In the first lean combustion operation region L1, the target air fuel ratio is basically set to be in the proximity of $\lambda=2$. If the target air fuel ratio is set lean at or close to a boundary between the first lean combustion operation region L1 and the second lean combustion operation region L2, the target air fuel ratio is set to a relatively small value such as 28.0 in the proximity of $\lambda=2$, and the area of lean air fuel ratio is broadened as wide as possible, in consideration of stop of electric intake air supply device 2.

As shown in FIG. 4, when determining at Step 8 that the battery SOC is lower than or equal to the lower limit SOClim, it proceeds from Step 8 to Step 9A, and selects the third air fuel ratio map as a target air fuel ratio map. Then, it proceeds to Step 10A, and operates internal combustion engine 1 in the lean combustion mode or stoichiometric combustion mode, in accordance with the value of the target air fuel ratio that is set for the current operating point. Accordingly, in the second embodiment, when in the first lean combustion operation region L1, the shift into the lean combustion mode is substantially permitted even when the battery SOC is low.

Although the foregoing describes the specific embodiments of the present invention in detail, the present invention is not limited to the embodiments, but contains various modifications. For example, although the shown embodiment is configured such that the lean air fuel ratio is in the proximity of $\lambda=2$, the present invention is not limited so, but may employ arbitrary lean air fuel ratios as appropriate. Although the shown embodiment includes electric supercharger 2 as an electric intake air supply device, the electric intake air supply device may be implemented by another type such as an electric assist turbocharger where rotation of a rotor driven by exhaust gas energy is assisted by an electric motor. It may be configured to employ both of an electric supercharger and an electric assist turbocharger.

The invention claimed is:

1. A control method for a vehicular internal combustion engine system including an internal combustion engine and an electric intake air supply device, wherein the internal combustion engine is structured to be shifted into a stoichiometric combustion mode in which a target air fuel ratio is set to a stoichiometric air fuel ratio, and a lean combustion mode in which the target air fuel ratio is set lean, and wherein the electric intake air supply device is structured to be driven by an on-vehicle battery, and employed to contribute a part of intake air quantity at least under a specific operating condition when in the lean combustion mode, the control method comprising:
    predefining a stoichiometric combustion operation region employing the stoichiometric combustion mode and a lean combustion operation region employing the lean combustion mode, with respect to a torque and a rotation speed of the internal combustion engine as parameters;
    determining a requested electric energy of the electric intake air supply device for a shift into the lean combustion mode in response to a shift from the stoichiometric combustion operation region into the lean combustion operation region; and
    continuing the stoichiometric combustion mode, without operation of the electric intake air supply device, when the on-vehicle battery is in an insufficient state of charge with respect to the requested electric energy.

2. The control method as claimed in claim 1, comprising:
    setting the requested electric energy in accordance with a break-even point in duration of the lean combustion mode for a situation including a shift from the stoichiometric combustion mode to the lean combustion mode and a following shift from the lean combustion mode to the stoichiometric combustion mode, wherein an increase in fuel quantity required to treat NOx generated during the situation, and a decrease in fuel quantity caused by employment of the lean combustion mode during the situation are in balance at the break-even point.

3. The control method as claimed in claim 1, comprising:
permitting a shift into the lean combustion mode, in response to a shift to an operating point in the lean combustion operation region at which a lean air fuel ratio is possible without employment of the electric intake air supply device.

4. The control method as claimed in claim 1, comprising:
setting a lower limit of SOC of the on-vehicle battery, based on the requested electric energy and an electric energy required by other on-vehicle electric components; and
determining whether or not the on-vehicle battery is in an insufficient state of charge, by comparison between the SOC of the on-vehicle battery and the lower limit.

5. The control method as claimed in claim 1, comprising:
determining the requested electric energy by taking account of a predicted pattern of vehicular operation during automatic vehicular operation.

6. The control method as claimed in claim 1, comprising:
preparing a lean air fuel ratio map, a stoichiometric air fuel ratio map, and a third air fuel ratio map, wherein:
in the lean air fuel ratio map, the target air fuel ratio is set lean for each operating point in the lean combustion operation region;
in the stoichiometric air fuel ratio map, the target air fuel ratio is set at or close to the stoichiometric air fuel ratio for each operating point at least in the stoichiometric combustion operation region; and
in the third air fuel ratio map, the target air fuel ratio is set at or close to the stoichiometric air fuel ratio, or lean, for each operating point in an operation region containing both of the stoichiometric combustion operation region and the lean combustion operation region, under assumption that the electric intake air supply device is at rest; and
employing the third air fuel ratio map in response to a condition that the on-vehicle battery is in an insufficient state of charge.

7. A control device for a vehicular internal combustion engine system including an internal combustion engine and an electric intake air supply device, wherein the internal combustion engine is structured to be shifted into a stoichiometric combustion mode in which a target air fuel ratio is set at or close to a stoichiometric air fuel ratio, and a lean combustion mode in which the target air fuel ratio is set lean, and wherein the electric intake air supply device is structured to be driven by an on-vehicle battery, and employed to contribute a part of intake air quantity at least under a specific operating condition when in the lean combustion mode, the control device comprising:
a controller configured to:
provide a control map predefining a stoichiometric combustion operation region employing the stoichiometric combustion mode and a lean combustion operation region employing the lean combustion mode, with respect to a torque and a rotation speed of the internal combustion engine as parameters;
determine a requested electric energy of the electric intake air supply device for a shift into the lean combustion mode in response to detection of a request for a shift from the stoichiometric combustion operation region into the lean combustion operation region; and
continue the stoichiometric combustion mode, without operation of the electric intake air supply device, when the on-vehicle battery is in an insufficient state of charge with respect to the requested electric energy.

8. The control method as claimed in claim 2, comprising:
permitting a shift into the lean combustion mode, in response to a shift to an operating point in the lean combustion operation region at which a lean air fuel ratio is possible without employment of the electric intake air supply device.

9. The control method as claimed in claim 2, comprising:
setting a lower limit of SOC of the on-vehicle battery, based on the requested electric energy and an electric energy required by other on-vehicle electric components; and
determining whether or not the on-vehicle battery is in an insufficient state of charge, by comparison between the SOC of the on-vehicle battery and the lower limit.

10. The control method as claimed in claim 3, comprising:
setting a lower limit of SOC of the on-vehicle battery, based on the requested electric energy and an electric energy required by other on-vehicle electric components; and
determining whether or not the on-vehicle battery is in an insufficient state of charge, by comparison between the SOC of the on-vehicle battery and the lower limit.

* * * * *